United States Patent
Kölscheid et al.

(10) Patent No.: US 8,689,583 B2
(45) Date of Patent: Apr. 8, 2014

(54) TURBOCOMPRESSOR TRAIN AND METHOD FOR OPERATION THEREOF AND NATURAL GAS LIQUEFACTION PLANT HAVING THE TURBOCOMPRESSOR TRAIN

(75) Inventors: Hans-Gerd Kölscheid, Duisburg (DE); Klaus Peters, Mülheim (DE)

(73) Assignee: Siemens Aktiengesellschaft, München (DE)

( * ) Notice: Subject to any disclaimer, the term of this patent is extended or adjusted under 35 U.S.C. 154(b) by 169 days.

(21) Appl. No.: 13/140,116

(22) PCT Filed: Dec. 1, 2009

(86) PCT No.: PCT/EP2009/066168
§ 371 (c)(1),
(2), (4) Date: Jun. 16, 2011

(87) PCT Pub. No.: WO2010/069759
PCT Pub. Date: Jun. 24, 2010

(65) Prior Publication Data
US 2011/0239699 A1    Oct. 6, 2011

(30) Foreign Application Priority Data
Dec. 18, 2008    (DE) .................... 10 2008 062 355 U

(51) Int. Cl.
*F25J 1/02*    (2006.01)
(52) U.S. Cl.
USPC ........................................ 62/612; 60/39.182
(58) Field of Classification Search
USPC .................................................. 62/612–613
See application file for complete search history.

(56) References Cited

U.S. PATENT DOCUMENTS

| | | | |
|---|---|---|---|
| 5,148,668 A * | 9/1992 | Frutschi | 60/775 |
| 5,386,687 A | 2/1995 | Frutschi | |
| 5,737,912 A * | 4/1998 | Krakowitzer | 60/774 |
| 6,691,531 B1 * | 2/2004 | Martinez et al. | 62/612 |
| 2002/0077512 A1 | 6/2002 | Record et al. | |

FOREIGN PATENT DOCUMENTS

| | | |
|---|---|---|
| CN | 1703606 A | 11/2005 |
| DE | 2102770 A1 | 8/1972 |
| EP | 0758045 A1 | 2/1997 |
| EP | 1512855 A1 | 3/2005 |
| EP | 1710400 A1 | 10/2006 |
| EP | 1903189 A1 | 3/2008 |
| EP | 1911939 A1 | 4/2008 |
| WO | WO 0249998 A1 | 6/2002 |
| WO | WO 2005024188 A2 | 3/2005 |

\* cited by examiner

*Primary Examiner* — John Pettitt
*Assistant Examiner* — Tareq M Alosh

(57) ABSTRACT

A turbo compressor train is provided. The turbo compressor train includes a turbo compressor unit and a drive assembly for driving the turbo compressor unit. The drive unit has a gas turbine and a generator and a steam turbine. The steam turbine may be coupled together with the generator to the turbo compressor unit and the gas turbine by means of a coupling device. The coupling device has an overrun coupling and a coupling exciter with which the overrun coupling may be taken from a disengaged condition to an active condition by engaging of the overrun coupling at synchronous speed of the gas turbine and the steam turbine and if the overrun coupling is engaged, disengages upon a speed increase to the steam turbine and generator so that the generator may be driven by the steam turbine at a higher speed than the turbocompressor unit by the gas turbine.

12 Claims, 2 Drawing Sheets

TURBOCOMPRESSOR TRAIN AND METHOD FOR OPERATION THEREOF AND NATURAL GAS LIQUEFACTION PLANT HAVING THE TURBOCOMPRESSOR TRAIN

CROSS REFERENCE TO RELATED APPLICATIONS

This application is the U.S. National Stage of International Application No. PCT/EP2009/066168, filed Dec. 1, 2009 and claims the benefit thereof. The International Application claims the benefits of German application No. 10 2008 062 355.5 DE filed Dec. 18, 2008. All of the applications are incorporated by reference herein in their entirety.

FIELD OF INVENTION

The invention refers to a turbocompressor train and a method for operating the turbocompressor train and to a natural gas liquefaction plant having the turbocompressor train.

BACKGROUND OF INVENTION

Natural gas is obtained in an offshore extraction facility, for example, and transported ashore via a pipeline. A large-scale chemical plant is located on land, by which the natural gas is separated into its constituents, which may be long-chain and short-chain hydrocarbon compounds, for example. The portion of the natural gas consisting of the short-chain hydrocarbons, after pressurizing, is fed to a natural gas supply network and offered on a natural gas market. The distribution of the natural gas is based on the consumption of the natural gas supply network so that countries which are not connected to the natural gas supply network, for example, are cut off from the natural gas market. The reasons for why these countries are not connected to the natural gas supply network lie in their geographical location, for example, which makes a connection of these countries to the natural gas supply network technically difficult or impossible. If this country is accessible from the sea, for example, then the possibility presents itself of supplying this country by the use of shipping. For this, the natural gas is liquefied by a natural gas liquefaction plant (also referred to as a liquid natural gas (LNG) plant) in the extraction area, consigned to a ship, transported by ship from the extraction area to the consumer country and regasified there for distribution.

Cited document WO 2005/024188 A2 describes a turbocompressor train which has a gas turbine and also a generator and a steam turbine, wherein the steam turbine together with the generator can be coupled to the turbocompressor unit.

A method for operating a single-shaft gas and steam turbine plant with overrunning clutch is known from cited document EP 1 710400 A1.

Cited document U.S. Pat No. 5,386,687 A discloses a turbocompressor train with a drive unit which has a gas turbine and also a generator and a steam turbine, wherein the steam turbine acts upon the generator of the turbocompressor unit.

Patent application WO 02/49998 deals with the improvement of a synthesis gas plant by installation of increased compressor power also by compressors being coupled to drive trains in different variants.

The natural gas liquefaction plant is located in the extraction area either on land or near to the coast in coastal waters on a floating island. In the natural gas liquefaction plant, the natural gas is cooled in a refrigeration cycle to such a degree that it can be liquefied. The refrigeration cycle conventionally has two turbocompressors which are driven by a gas turbine or an electric motor. In the case of an annual production of the natural gas liquefaction plant of 5 to 10 megatons per year, single-shaft gas turbines are used, wherein the two turbocompressors are intercoupled by their shafts. Conventional single-shaft gas turbines do not adequately deliver torque at low rotational speeds so that the two turbocompressors cannot be started by them. Assistance is created in this case by the use of a booster starter motor which is coupled to the turbocompressor and provides additional torque during the starting process so that the turbocompressors can be started by the gas turbine together with the booster starter motor.

SUMMARY OF INVENTION

It is the object of the invention to create a turbocompressor train and a method for operating the turbocompressor train and also a natural gas liquefaction plant having the turbocompressor train, wherein the turbocompressor train can be started and operated in a simple and energy-saving manner.

The turbocompressor train according to the invention has a turbocompressor unit and, for driving the turbocompressor unit, a drive unit which can consist of a gas turbine and also a generator and a steam turbine. The steam turbine can be coupled together with the generator to the turbocompressor unit and to the gas turbine by means of a coupling device. The coupling device has an overrunning clutch and a clutch exciter by which the overrunning clutch can be brought from a disengaged state to an active state in which the overrunning clutch is engaged in the event of synchronous rotational speed of the gas turbine and the steam turbine and, if the overrunning clutch is engaged, is disengaged in the event of an increase of the rotational speed of the steam turbine and the generator, so that the generator can be driven by the steam turbine at a higher rotational speed than the turbocompressor unit can be driven by the gas turbine.

The turbocompressor unit preferably has a low-pressure turbocompressor and a high-pressure turbocompressor which are connected in series and designed as single-shaft compressors which by their shafts are intercoupled by a second coupling. The gas turbine is preferably designed in an axial type of construction and by its compressor shaft is coupled to the shaft of the low-pressure turbocompressor by a first coupling. In addition, the generator and the steam turbine are coupled by their shafts by a third coupling.

The natural gas liquefaction plant according to the invention has a first refrigeration cycle train, a second refrigeration cycle train and a third refrigeration cycle train, wherein the second refrigeration cycle train and the third refrigeration cycle train are formed in each case by the turbocompressor train. The natural gas liquefaction plant also preferably has a steam main and a steam generator by which live steam can be fed to the steam main, wherein the steam turbine of the first refrigeration cycle train, the steam turbine of the second refrigeration cycle train and the steam turbine of the third refrigeration cycle train can be operated with the live steam of the steam main. In addition, a thermal exhaust gas output of the gas turbine of the second refrigeration cycle train and a thermal exhaust gas output of the gas turbine of the third refrigeration cycle train can be supplied to the steam main.

The natural gas liquefaction plant has an electricity network with an electrical load connected thereto, wherein an electric output of the generator of the second refrigeration cycle train and an electric output of the generator of the third refrigeration cycle train can be fed to the electricity network.

The method according to the invention for operating the turbocompressor train features the steps: making available the turbocompressor train, wherein the turbocompressor train is in the stationary state and the overrunning clutch is held in the disengaged state by the clutch exciter; running up the steam turbine—taking into consideration the holding points which are required for the steam turbine for reasons of stability—until the steam turbine has reached its operating temperature and the operating speed of the turbocompressor train; running down the steam turbine to the stationary state; operating the clutch exciter so that the overrunning clutch is brought from the disengaged state to the active state and consequently engaged, as a result of which the steam turbine, the generator, the turbocompressor unit and the gas turbine are coupled to each other; and running up the gas turbine together with the steam turbine until the turbocompressor train has reached its operating speed.

The method for operating the turbocompressor train also preferably features the step: increasing the rotational speed of the steam turbine so that the overrunning clutch is disengaged and the generator is operated by the steam turbine at a higher rotational speed than the turbocompressor unit is operated by the gas turbine. The rotational speed of the turbocompressor unit and the gas turbine lies preferably at 3000 revolutions per minute, and the rotational speed of the steam turbine and the generator lies preferably at 3600 revolutions per minute so that an electricity network can be fed with electric power synchronized at 60 Hz by the generator.

As an alternative, the method for operating the turbocompressor train preferably features the step: operating the turbocompressor train at the operating speed, wherein the steam turbine, the generator, the turbocompressor unit and the gas turbine are coupled together and the generator together with the turbocompressor unit is driven by the steam turbine and the gas turbine.

BRIEF DESCRIPTION OF THE DRAWINGS

In the following text, a preferred embodiment of the turbocompressor train according to the invention and of the natural gas liquefaction plant according to the invention are explained with reference to the attached schematic drawings. In the drawing.

DETAILED DESCRIPTION OF INVENTION

Figure 1:
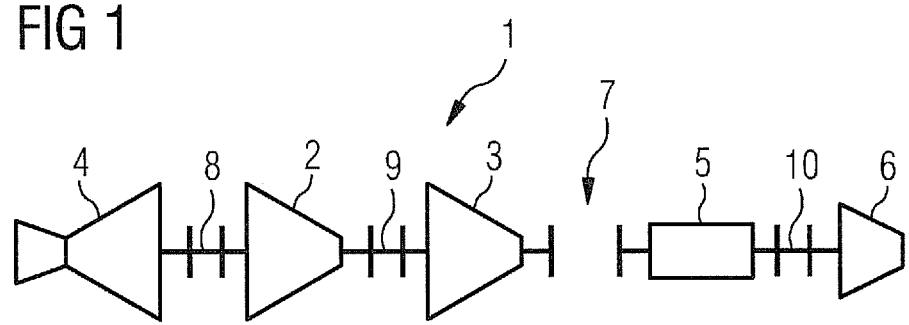
FIG. 1 shows a schematic view of an embodiment according to the invention of the turbocompressor train and FIG. 2 shows a schematic view of an embodiment according to the invention of the natural gas liquefaction plant.

As is apparent from FIG. 1, a turbocompressor train 1 has a low-pressure turbocompressor 2 and a high-pressure turbocompressor 3 which are connected in series and designed in each case as a single-shaft compressor. In addition, the turbocompressor train 1 has a gas turbine 4, designed in an axial type of construction, which by its compressor is coupled to the low-pressure turbocompressor 2. Furthermore, the turbocompressor train 1 has a generator 5 and a steam turbine 6 which are coupled together.

The steam turbine 6, together with the generator 5, can be coupled to the high-pressure turbocompressor 3 by means of a coupling device 7. The coupling device 7 has an overrunning clutch (not shown) and a clutch exciter (not shown) by which the overrunning clutch can be brought from a disengaged state to an active state in which the overrunning clutch is engaged in the event of synchronous rotational speed of the gas turbine 4 and the steam turbine 6. If the overrunning clutch is engaged, the overrunning clutch is disengaged in the event of an increase of the rotational speed of the steam turbine 6 and the generator 5 so that the generator 5 can be driven by the steam turbine 6 at a higher rotational speed than the low-pressure turbocompressor 2 and the high-pressure turbocompressor 3 can be driven by the gas turbine 4.

The gas turbine 4 is coupled to the low-pressure turbocompressor 2 by means of a first coupling 8. By their shafts, the low-pressure turbocompressor 2 and the high-pressure turbocompressor 3 are intercoupled by a second coupling 9. In addition, by their shafts, the generator 5 and the steam turbine 6 are coupled by a third coupling 10.

During starting of the turbocompressor train 1, the turbocompressor train 1 is first held in the stationary state and the overrunning clutch is held in the disengaged state by the clutch exciter. The steam turbine 6, coupled to the generator 5 by means of the third coupling 10, is run up, wherein the holding points, which are necessary for the steam turbine 6 for reasons of stability, are observed. The rotational speed of the steam turbine 6 is increased to the operating speed of the turbocompressor train 1 and held at this operating speed until the steam turbine 6 has reached its operating temperature. After this, the steam turbine 6 is run down again to the stationary state. As soon as the steam turbine 6 has reached the stationary state, the clutch exciter is operated so the overrunning clutch is brought from the disengaged state to the active state. As a result, the overrunning clutch is engaged, as a result of which the steam turbine 6, the generator 5, the low-pressure turbocompressor 2, the high-pressure turbocompressor 3 and the gas turbine 4 are coupled together. The gas turbine 4 is then run up together with the steam turbine 6 until the turbocompressor train 1 has reached its operating speed.

The operating speed of the turbocompressor train 1 lies at 3000 revolutions per minute, for example. The shaft power which is yielded by the gas turbine 4 to the turbocompressor train 1 lies at 164 MW, for example, and the shaft power which is delivered by the steam turbine 6 amounts to 40 MW, for example. The turbocompressor train 1 is operated in this operating state, wherein the steam turbine 6, the generator 5, the low-pressure turbocompressor 2, the high-pressure turbocompressor 3 and the gas turbine 4 are coupled together. The generator 5, together with the low-pressure turbocompressor 2 and the high-pressure turbocompressor 3, are driven by the steam turbine 6 and the gas turbine 4.

Alternatively, the rotational speed of the steam turbine 6 can be increased to 3600 revolutions per minute, for example, so that the overrunning clutch is disengaged and the generator 5 is driven by the steam turbine 6 at higher speed than the turbocompressor unit 1 is driven by the gas turbine 4, that is to say at 3000 revolutions per minute. At the rotational speed of 3600 revolutions per minute, an electric power output can be fed at 60 Hz by the generator 5 to an electricity network.

Figure 2:
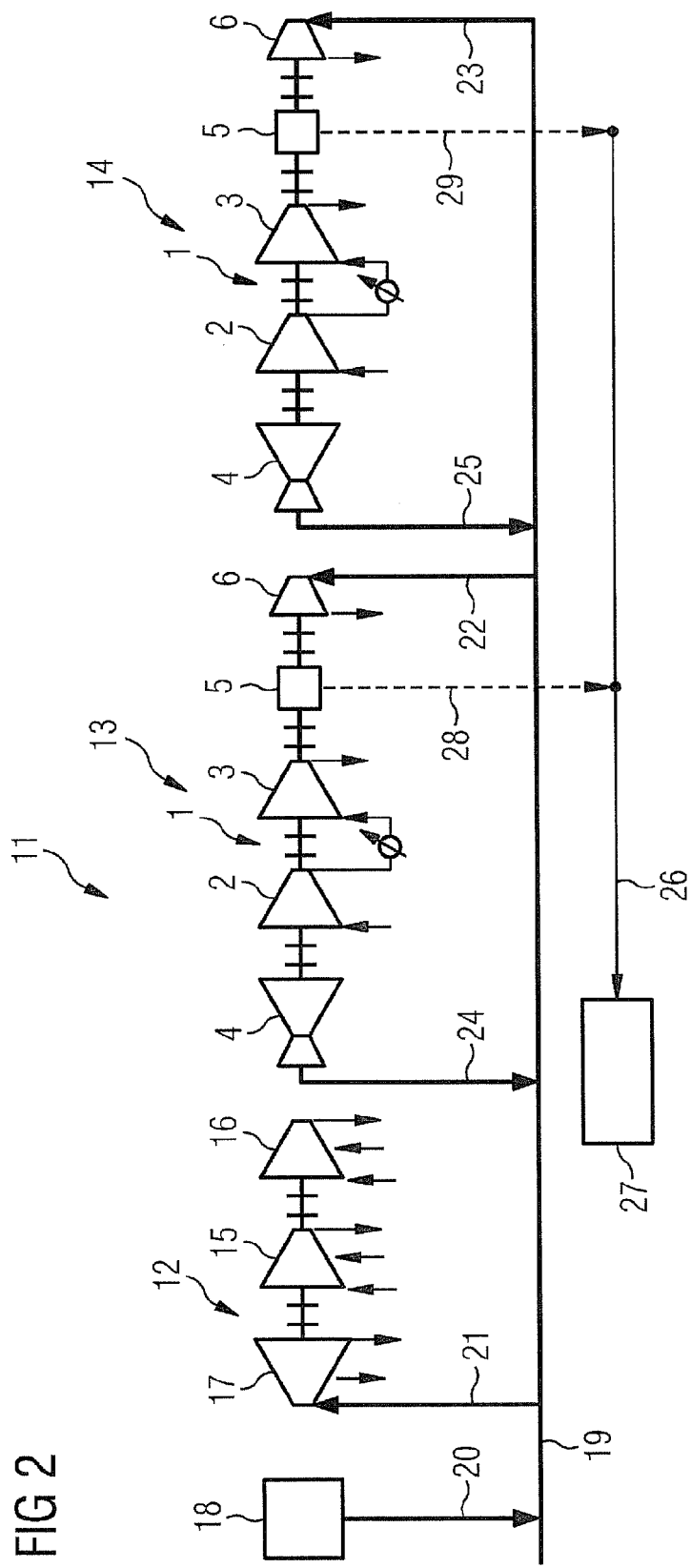

As is apparent from FIG. 2, a natural gas liquefaction plant 11 has a first refrigeration cycle train 12, a second refrigeration cycle train 13 and a third refrigeration cycle train 14. The second refrigeration cycle train 13 and the third refrigeration cycle train 14 are formed in each case by the turbocompressor train 1. The natural gas liquefaction plant 11 also has a steam generator 18 and a steam main 19, wherein a live steam output 20 is fed to the steam main 19 by the steam generator 18. Branched off from the steam main 19, the steam turbine 17 of the first refrigeration cycle train 12 is operated by a live steam output 21, the steam turbine 6 of the second refrigeration cycle train 13 is operated by a live steam output 22, and the steam turbine 6 of the third refrigeration cycle train 14 is operated by a live steam output 23. In addition, the thermal exhaust gas outputs 24, 25 of the gas turbines 4 of the second refrigeration cycle train 13 and of the third refrigeration cycle train 14 are supplied to the steam main 19.

The natural gas liquefaction plant 11 furthermore has an electricity network 26 at 60 Hz to which is connected an electric load 27. The electric outputs 28 and 29 are fed to the electricity network 26 by the generators 5 of the second refrigeration cycle train 13 and of the third refrigeration cycle train 14. By the generators 5 being operated at 3600 revolutions per minute, the generators 5 are operated in synchronism with the electricity network 26.

In the embodiment which is shown in FIG. 2, the live steam output 20 of the steam generator 18 and the live steam output 21 of the steam turbine 6 of the first refrigeration cycle train 12 amount to 150 MW in each case. In addition, the live steam output 22 of the steam turbine 6 of the second refrigeration cycle train 13 and the live steam output 23 of the steam turbine 6 of the third refrigeration cycle train 14 amount to 40 MW in each case. The thermal exhaust gas output 24 of the gas turbine 4 of the second refrigeration cycle train 13 and the thermal exhaust gas output 25 of the gas turbine 4 of the third refrigeration cycle train 14 amount to 75 MW in each case. Taking efficiency into consideration, a power surplus in the generators 5 results from this so that the electric power 28 of the generator 5 of the second refrigeration cycle train 13 and the electric power 29 of the generator 5 of the third refrigeration cycle train 14 amounts to 40 MW in each case. Therefore, an electric power of 80 MW at 60 Hz is made available to the electric load 27.

The invention claimed is:

1. A turbocompressor train, comprising:
a turbocompressor unit; and
a drive unit for driving the turbocompressor unit, the drive unit, comprising:
a gas turbine,
a generator, and
a steam turbine; wherein the steam turbine together with the generator may be coupled to the turbocompressor unit and to the gas turbine by means of a coupling device which includes an overrunning clutch and a clutch exciter,
wherein the coupling device is designed in such a way that by the clutch exciter the overrunning clutch may be brought from a disengaged state to an engaged state in which the overrunning clutch is engaged in the event of synchronous speed of the gas turbine and the steam turbine wherein when the overrunning clutch is in disengaged state, the steam turbine is run up until the steam turbine has reached its operating temperature and an operating speed of the turbocompressor unit in order to evaluate a plurality of holding points for stabilizing the steam turbine and wherein the steam turbine is run down to a stationary state prior to bringing the overrunning clutch to the engaged state, and
wherein in the event of an increase of rotational speed of the steam turbine and the generator when the overrunning clutch is engaged, the overrunning clutch is autonomously disengaged due to the increase of rotational speed of the steam turbine and the generator, so that the generator may be driven by the steam turbine at a higher rotational speed than the turbocompressor unit can be driven by the gas turbine.

2. The turbocompressor train as claimed in claim 1, wherein the turbocompressor unit includes a low-pressure turbocompressor and a high-pressure turbocompressor which are connected in series wherein each compressor includes a single shaft and the shafts are intercoupled by a second coupling.

3. The turbocompressor train as claimed in claim 2, wherein the gas turbine includes an axial turbine having a compressor shaft that is coupled to a first shaft of the low-pressure turbocompressor by a first coupling.

4. The turbocompressor train as claimed in claim 1, wherein the generator and the steam turbine are coupled by their shafts by a third coupling.

5. A natural gas liquefaction plant, comprising:
a first refrigeration cycle train;
a second refrigeration cycle train; and
a third refrigeration cycle train,
wherein the second refrigeration cycle train and the third refrigeration cycle train are formed in each case by a turbocompressor train as claimed in claim 1.

6. The natural gas liquefaction plant as claimed in claim 5, further comprising a steam main and a steam generator,
wherein the steam generator feeds live steam to the steam main, and
wherein a first steam turbine of the first refrigeration cycle train, a second steam turbine of the second refrigeration cycle train and a third steam turbine of the third refrigeration cycle train are operated by the live steam of the steam main.

7. The natural gas liquefaction plant as claimed in claim 6, wherein a first thermal exhaust gas output of a second gas turbine of the second refrigeration cycle train and a second thermal exhaust gas output of a third gas turbine of the third refrigeration cycle train are supplied to the steam main.

8. The natural gas liquefaction plant as claimed in claim 5, further comprising an electricity network with an electric load connected thereto,
wherein a first electric output of a second generator of the second refrigeration cycle train and a second electric output of a third generator of the third refrigeration cycle train is fed to the electricity network.

9. A method for operating a turbocompressor train, comprising:
providing a turbocompressor train having a turbocompressor unit, a drive unit for driving the turbocompressor unit wherein the drive unit includes a gas turbine, a generator and a steam turbine and wherein the steam turbine together with the generator may be coupled to the turbocompressor unit and to the gas turbine by means of a coupling device which includes an overrunning clutch and a clutch exciter wherein the turbocompressor train is held in a stationary state and the overrunning clutch is held in the disengaged state by the clutch exciter;
running up the steam turbine, by taking into consideration a plurality of holding points which are necessary for the steam turbine for reasons of stability, until the steam turbine has reached its operating temperature and an operating speed of the turbocompressor train;
operating the clutch exciter so that the overrunning clutch is brought from the disengaged state to an active state and consequently engaged, and as a result of which the steam turbine, the generator, the turbocompressor unit and the gas turbine are coupled together;
running down the steam turbine to the stationary state prior to operating the clutch exciter; and
running up the gas turbine together with the steam turbine until the turbocompressor train has reached its operating speed.

10. The method as claimed in claim 9, further comprising:
increasing a first rotational speed of the steam turbine so that the overrunning clutch is disengaged and the generator is operated by the steam turbine at a higher rotational speed than the turbocompressor unit is operated by the gas turbine.

11. The method as claimed in claim 10, wherein a second rotational speed of the turbocompressor unit and the gas turbine lies at 3000 revolutions per minute and the first rotational speed of the steam turbine and the generator lies at 3600 revolutions per minute so that electric power synchronized at 60 Hz is supplied to an electricity network by the generator.

12. The method as claimed in claim 9, further comprising:
   operating the turbocompressor train at the operating speed, wherein the steam turbine, the generator, the turbocompressor unit and the gas turbine are coupled together and the generator together with the turbocompressor unit are driven by the steam turbine and the gas turbine.

\* \* \* \* \*